US011939082B1

(12) United States Patent
Akhter et al.

(10) Patent No.: US 11,939,082 B1
(45) Date of Patent: Mar. 26, 2024

(54) ACOUSTICALLY ENHANCED LANDING PAD FOR GROUND-EFFECT NOISE SUPPRESSION

(71) Applicant: United Arab Emirates University, Al Ain (AE)

(72) Inventors: Zishan Akhter, Al Ain (AE); Farag K Omar, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 18/124,888

(22) Filed: Mar. 22, 2023

(51) Int. Cl.
 *B64F 1/26* (2006.01)
(52) U.S. Cl.
 CPC ..................... *B64F 1/26* (2013.01)
(58) Field of Classification Search
 CPC ..................... B64F 1/26; E01F 3/00
 See application file for complete search history.

(56) References Cited

U.S. PATENT DOCUMENTS

| | | | | | |
|---|---|---|---|---|---|
| 4,700,912 | A | * | 10/1987 | Corbett | B64F 1/00 244/114 R |
| 5,591,904 | A | * | 1/1997 | Schafhaupt | B64F 1/26 73/147 |
| 5,607,742 | A | * | 3/1997 | Ing | E01C 9/008 428/592 |
| 8,499,847 | B2 | * | 8/2013 | Uppal | A62C 99/0072 244/114 R |
| 2007/0029442 | A1 | * | 2/2007 | Wolter | B64F 1/36 244/114 R |

OTHER PUBLICATIONS

Pafa Consulting Engineers, Helideck Structural Requirements, Middlesex, 2001, pp. 1-102.
Federal Aviation Administration (FAA), Heliport Design—Advisory Circular, 2012, pp. 1-196.
D. Heredia Chávez, "Structural design of helicopter landing platform for super-yacht "EMSHIP" Erasmus Mundus Master Course in Integrated Advanced Ship Design," 2013, pp. 1-36.
Bell Nexus—Transforming Your Commute, (n.d.), https://www.bellflight.com/products/bell-nexus <accessed Mar. 22, 2023>.
Introduction to Ansys Mechanical APDL | Ansys Training, (n.d.), presentation, pp. 1-20.
Y. Champoux, "Dynamic tortuosity and bulk modulus in air-saturated porous media", Journal, 1990, 1975-1979, vol. 70, J Appl Phys.

* cited by examiner

*Primary Examiner* — Jeremy A Luks
(74) *Attorney, Agent, or Firm* — MH2 TECHNOLOGY LAW GROUP, LLP

(57) ABSTRACT

The invention discloses a system for reducing ambient noise generated from an acoustic domain, comprising a landing pad comprising a plurality of zones of varied porosity levels over specified sections, and a plurality of perforated channels across the plurality of zones of varied porosity levels, the perforated channels comprising a plurality of aqueous sheets placed at an inlet of the perforated channels and along the perforated channels. Also disclosed is a method of reducing ambient acoustic noise produced by unmanned aerial vehicle (UAV) operations, the method comprising the steps of absorbing acoustic energy produced by the UAV via a plurality of zones of varied porosity levels, present in a UAV landing pad, resulting in reducing sound-pressure transmission-loss of propeller downwash across the plurality of zones of varied porosity.

6 Claims, 14 Drawing Sheets

ACOUSTICALLY ENHANCED LANDING PAD FOR GROUND-EFFECT NOISE SUPPRESSION

FIELD OF THE INVENTION

The present invention relates to the field of unmanned aerial vehicles (UAVs), and more particularly to a system and method for achieving ambient noise suppression for UAV operations.

BACKGROUND OF THE INVENTION

Background description includes information that will be useful in understanding the present invention. It is not an admission that any of the information provided herein is prior art or relevant to the presently claimed invention, or that any publication specifically or implicitly referenced is prior art.

Aviation has done a remarkable job in providing connections around the world and on longer domestic routes. However, it is of limited use for shorter regional journeys. For journeys between 50 and 400 kilometers, people are usually forced to use ground transport. Air mobility can save people, cargo and hours, while reducing fuel consumption and emissions on typically inefficient ground routes. Rapid urbanization and the creation of new megacities require disruptive urban mobility solutions to ease the daily commutes of thousands of people. Reducing commute times, bypassing ground congestion and enabling point-to-point flights between cities could significantly improve the work-life balance of people living in and around cities. Urban Air Mobility (UAM) is a system that provides on-demand, highly automated air transport services for passengers or cargo within and around a metropolitan area, usually in low-altitude airspace. UAM is a new mode of air transport in which everything from small package delivery drones to passenger-carrying air taxis fly over densely populated areas. VTOL, or vertical take-off and landing, refers to aircraft/drones that can take off, hover and land vertically. They are best suited to support the growth of the UAM industry. Passenger transport services include air taxi, medical evacuation, disaster relief, rescue and relief, law enforcement and public safety, among others. For cargo delivery, VTOL UAVs will offer greater capacity and efficiency than traditional cargo transport. Urban air mobility will add value to cities and will be a critical component of smart cities in the future. The European Union Aviation Safety Agency (EASA) has pioneered the certification of VTOLs by issuing a Special Condition on 2 Jul. 2019.

The push for widespread expansion of Urban Air Mobility (UAM) is gaining momentum around the world. The industry has attracted around 200 companies, with Airbus (Europe), Boeing (US) and Bell Helicopter Textron as the major players. The UAM market is currently in its early stages, with first commercialization scheduled for 2023. It is expected to grow rapidly, with a CAGR of 16.2% to 2030, and a global value of $3.1 billion in 2023, rising to $7.9 billion in 2030. VTOL UAVs are broadly divided into four categories based on their architecture, namely quadcopters (wingless design with four symmetrically arranged fixed propellers, e.g. eHang 184 2), multi-copters (wingless design with more than four fixed propellers for distributed propulsion, e.g. Volocopter), hybrid design (winged design with dedicated fixed propeller for forward flight and retractable propellers for take-off/landing assistance, e.g. Kitty Hawk), for take-off/landing assistance, e.g. Kitty Hawk) and tiltwing (winged design with tilting wings and/or propellers for in-flight thrust management required for take-off/landing, hovering and flying, e.g. Bell Nexus) and thrust vectoring (winged design with multi-directional jet fans for thrust vectoring, e.g. Lilium UAE also plans to be among the early adopters of UAMs, which will begin to be regulated as early as 2016).

Additionally, in June 2017, Volocopter GMBH and Dubai's Roads and Transport Authority (RTA) announced an agreement to conduct a five-year test program to assess the viability of autonomous VTOL air taxi services in Dubai. The list of VTOL UAVs undergoing flight testing in the UAE includes eHang-184, Volocopter and Xpeng-X2. The annual GITEX exhibition in Dubai has hosted several VTOL UAVs. The Dubai Programme to Enable Drone Transportation was recently launched at the Dubai Airshow 2021. The aim of the program is to explore the use of drones in a variety of fields, including health, security, shipping and food. The program aims to improve people's lives by reducing the carbon emissions generated by traditional shipping and transport services, while making goods and materials more accessible. To realize the UAM, the Sky-Dome initiative was recently launched to create a virtual airspace infrastructure for drone systems.

It will connect public spaces and buildings through a network of airstrips and vertiports (helicopter landing pads) across Dubai, and will also develop major infrastructure projects for airports, airstrips, multi-use stations and ground service facilities. The UAE National Strategy for Advanced Innovation recognizes transport as a priority sector and promotes innovation through the development and use of unmanned vehicles. Accordingly, the Dubai Self-Driving Transport Strategy is overseen by the Roads and Transport Authority (RTA) and aims to make 25% of all mobility journeys driverless by 2030. It complements the Dubai 2040 Urban Master Plan, which aims to position Dubai as a preferred smart city. Several complex technological issues need to be addressed to ensure the unhindered emergence and sustainable development of UAMs. Propulsion, situational awareness systems, and enhanced detection and collision avoidance systems are among the persistent issues. While on-board technology is rapidly improving, ambient noise remains a limiting element and a challenging problem to address. Noise from VTOL UAVs is primarily generated by the propellers and can be categorized into tonal and broadband noise. The former is generated due to propeller thickness and disc loading, while the source of the latter varies with the UAV architecture discussed above. In quadcopters and multi-copters, broadband noise is generated by propeller-vortex interactions, similar to helicopters. In hybrid, tiltwing and thrust-vectoring UAVs, broadband noise is associated with the turbulent boundary layers and unsteady inflow conditions. Intensive research is being carried out by academia and industry to improve the aeroacoustic performance of propellers. Attempts have been made to reduce UAV noise by up to 30 dBA at the dominant frequency by replacing propellers with ducted fans with active flow control.

Attempts have also been made to achieve noise reduction using porous materials and surface coatings in various engineering fields. Regardless, the ambient noise from UAV operations must be limited to qualify for commercial certification. Although a fixed noise level has not yet been declared for UAV operations, it must still comply with the UAE noise standards of <55 dBA during the day and <45 dBA at night. Similarly, the WHO Environmental Noise Guidelines for the European Union (EU) suggest that aircraft noise >45 dB has adverse health effects, including sleep disturbance. The noise spectrum of drones is spread over higher frequencies compared to helicopters due to the comparatively higher propeller speed.

Based on the above, there is a need to develop a new approach to overcome the drawbacks and shortcomings of these traditionally implemented systems and methods with respect to UAV operations, and to show better results.

SUMMARY OF THE INVENTION

Aspects of the disclosed embodiments seek to provide a system and method for achieving ambient noise suppression for UAV operations.

Embodiments of the present invention relates to a system for reducing ambient noise generated from an acoustic domain, comprising a landing pad comprising a plurality of zones of varied porosity levels over specified sections, and a plurality of perforated channels across the plurality of zones of varied porosity levels, the perforated channels comprising a plurality of aqueous sheets placed at an inlet of the perforated channels and along the perforated channels.

In accordance with an embodiment of the present invention, the acoustic domain is segregated into three sub-domains comprising downwash area, perforated channel, and vent.

In accordance with an embodiment of the present invention, the specified sections have fixed lengths and porosity levels.

In accordance with another embodiment of the present invention, the specified sections have variable lengths and porosity levels.

In accordance with another embodiment of the present invention, aqueous droplets present in the aqueous sheet act as damping agents/barriers for the ambient noise, and thereby reduce overall amplitude and turbulence of passing sound waves.

In accordance with another embodiment of the present invention, the plurality of aqueous sheets are placed non-equidistant from each other, and operate at varying injection pressure or mass flow rates.

In accordance with another embodiment of the present invention, the proposed system aims at reducing ambient noise produced by unmanned aerial vehicle (UAV) operations.

As another aspect of the present invention, a method of reducing ambient acoustic noise produced by unmanned aerial vehicle (UAV) operations is proposed, the method comprising the steps of absorbing acoustic energy produced by the UAV via a plurality of zones of varied porosity levels, present in a UAV landing pad, resulting in reducing sound-pressure transmission-loss of propeller downwash across the plurality of zones of varied porosity.

In accordance with an embodiment of the present invention, acoustic analysis of the system is conducted over the frequency range of 100-3500 Hz.

In accordance with an embodiment of the present invention, the acoustic analysis monitors and records sound pressure level suppression, noise/acoustic absorbance, sound transmission loss and deformation (acoustic pressure) reduction levels generated by a UAV operation.

In accordance with an embodiment of the present invention, the plurality of zones of varied porosity levels are tasked with channeling UAV propeller downwash through the plurality of perforated channels, leading to a significant ambient acoustic noise reduction.

In accordance with an embodiment of the present invention, a mesh element size of 0.014 m is uniformly maintained to satisfy the constraint of maximum element size ≤λ min/6 (0.0163 m), for the acoustic analysis.

In accordance with an embodiment of the present invention, the monitored noise/acoustic absorbance at the landing pad surface is up to 42.3% with a return loss of up to 2.39 dB.

In accordance with an embodiment of the present invention, the monitored sound transmission loss across the perforated channels is up to 92 dB, and deformation reduction up to 99.5%.

In accordance with an embodiment of the present invention, the overall sound pressure levels resulting from the landing pad are between 32-105 dB, with an average of 62.5 dB.

Additional aspects of the invention will be set forth in part in the description which follows, and in part will be obvious from the description, or may be learned by practice of the invention.

BRIEF DESCRIPTION OF THE DRAWINGS

The manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1A:
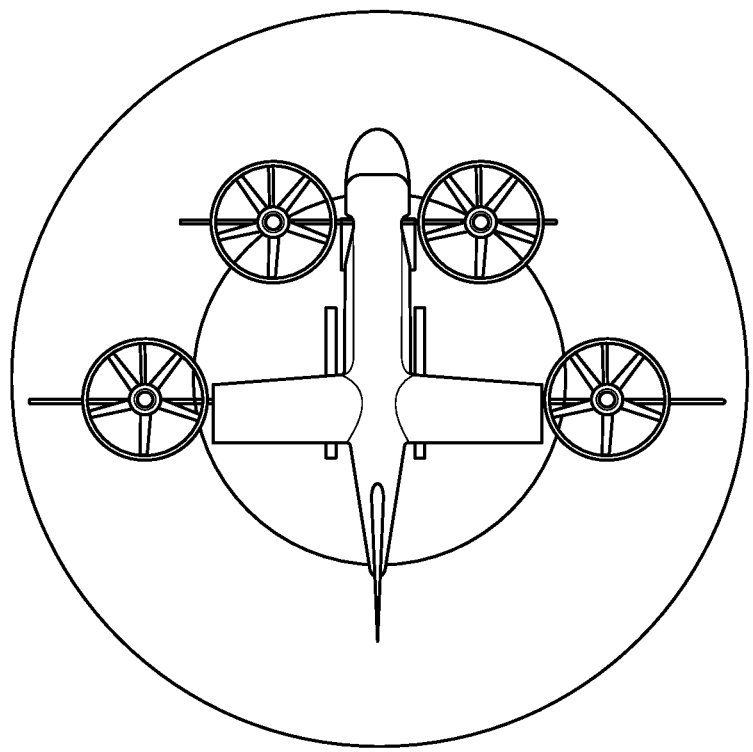
FIGS. 1A and 1B are 3D models of a UAV in take-off/landing configuration on a conventional helipad.

The foregoing and other objects, features and advantages of the present invention, as well as the invention itself, will be more fully understood from the following description of preferred embodiments, when read together with the accompanying drawings.

DETAILED DESCRIPTION

The present invention relates to the field of unmanned aerial vehicles (UAVs), and more particularly to a system and method for achieving ambient noise suppression for UAVs.

The principles of the present invention and their advantages are best understood by referring to FIG. 1A to FIG. 12B. In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

The primary objective of the present invention is to reduce the acoustic energy/ambient noise produced by unmanned aerial vehicle (UAV) operations. UAV noise associated with urban air mobility (UAM) services such as, but not limited to, air taxi, emergency response and logistics/last-mile delivery is of grave concern, especially within and around metropolitan areas. Acoustics is the science concerned with the production, control, transmission, reception, and effects of sound.

As a solution to this issue, the proposed landing-pad design features porous regions which effectively absorb the sound waves and reduce their intensity, thereby significantly suppressing overall operational noise. The proposed UAV landing-pad design comprises a landing pad with a plurality of zones of varied porosity over specified sections/regions, perforated channels across the plurality of zones/regions of varied porosity also having fixed or varied lengths and porosity levels.

The present invention also focusses on a method of noise suppression comprising the steps of acoustic energy (or sound) absorbance by the plurality of zones/regions of varied porosity, followed by reduced acoustic (or sound) reflectance from the proposed UAV landing-pad design sound, and then sound-pressure transmission-loss of propeller downwash across the perforated channels or plurality of zones of varied porosity.

Transmission loss (TL) in general describes the accumulated decrease in intensity of a waveform energy as a wave propagates outwards from a source, or as it propagates through a certain area or through a certain type of structure. In aeronautics, downwash is the change in direction of air deflected by the aerodynamic action of an airfoil, wing, or helicopter rotor blade in motion, as part of the process of producing lift. Upwash means the upward movement of air just before the leading edge of the wing. A corresponding downwash occurs at the trailing edge.

Figure 1B:
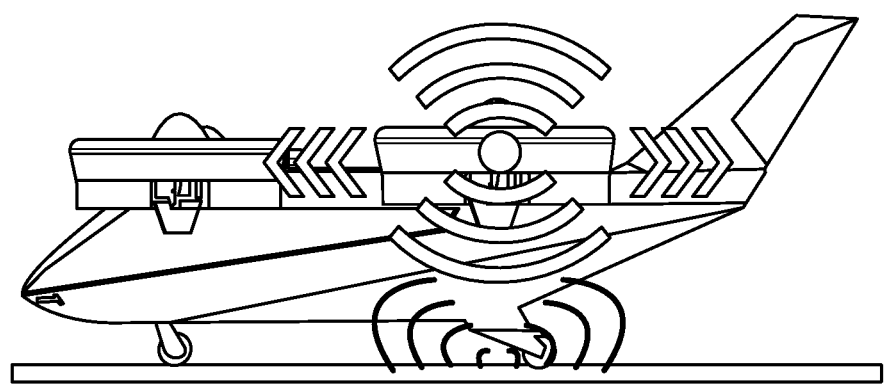

FIGS. 1a and 1B depict a conventional helipad/landing-pad constructed using a non-porous base which deflects the downwash in the lateral direction. The rigid structure also acts a reflectance boundary for the acoustic waves, thereby dispersing sound in the ambiance. The acoustic noise generation, dispersion, and reflection is accordingly illustrated.

Figure 2:
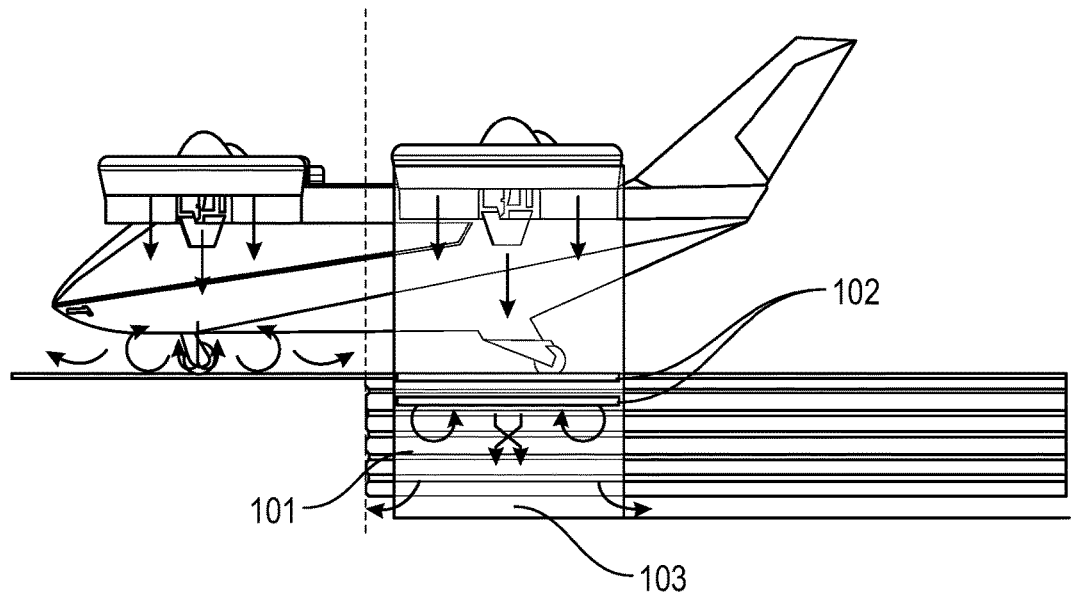
FIG. 2 illustrates the proposed UAV landing-pad design which features porous zone(s) or a plurality of zones/regions of varied porosity which are tasked with channeling the propeller downwash through perforated media.

FIG. 2 illustrates the proposed UAV landing-pad design which features porous zone(s) 101 or a plurality of zones/regions of varied porosity which are tasked with channeling the propeller downwash through perforated media. This design renders the surface 'absorbent' boundary-condition, generating noticeable acoustic return losses. Further, downwash funneling through the inherent perforated channels result in significant sound transmission loss. Collectively, this stimulates significant reduction in the ambient noise. Considering CFD modelling, the proposed landing-pad design is computationally analyzed using Acoustic Harmonics and Acoustic Response modules of commercial Ansys software package (real-time incorporation of the aqueous sheet/curtain will further enhance the acoustic suppression/dampening performance of the landing-pad). The Bell Nexus 4EX UAV is selected for the case study (and the study is conducted using Johnson-Champoux-Allard (JCA) poro-acoustic model), detailed in Table 1.

TABLE 1

| Design and technical specifications of Bell Nexus 4EX UAV | |
|---|---|
| Features | Details |
| Weight | 3175 kg |
| Payload | 5 pax (4 + 1) |
| Range | 97 km |
| Cruise speed | 240 km/h |
| Propellers (ducted) | 4 |
| Propeller diameter | 2.5 m |
| Dimensions | 12 m × 12 m |

Figure 3:
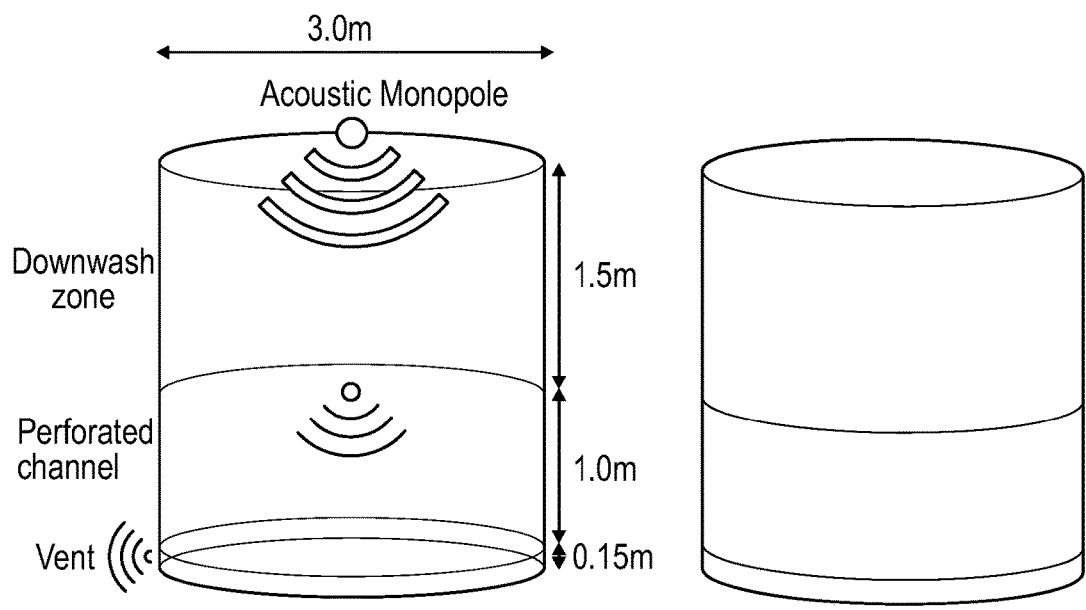
FIG. 3 depicts the acoustic domain segregated into three sub-domains comprising downwash area, perforated channel, and vent, in accordance with the present invention.
Figure 4A:
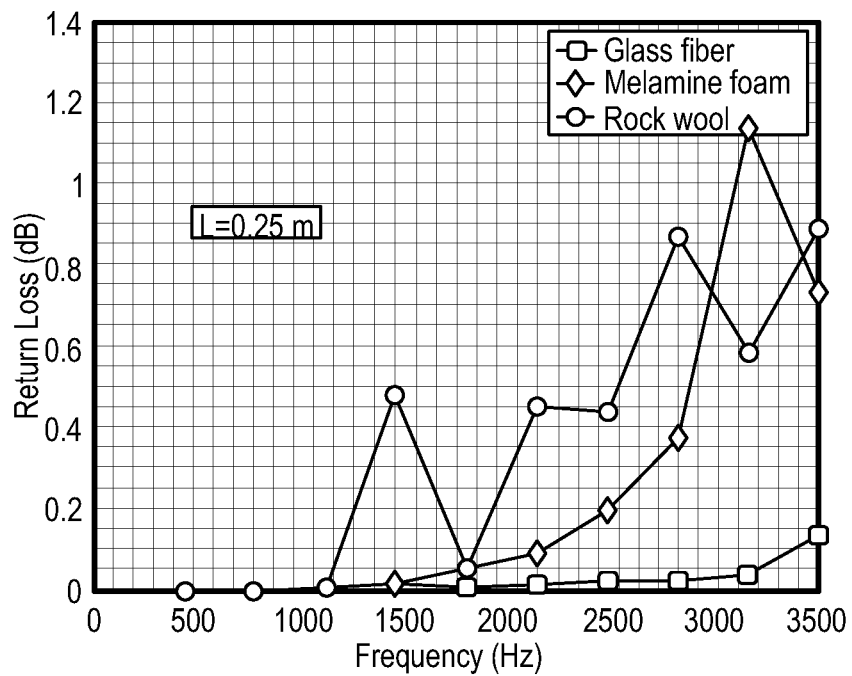
FIGS. 4A-4D are graphical representations of the analyzed return loss for selected porous materials using various channel lengths.
Figure 4B:
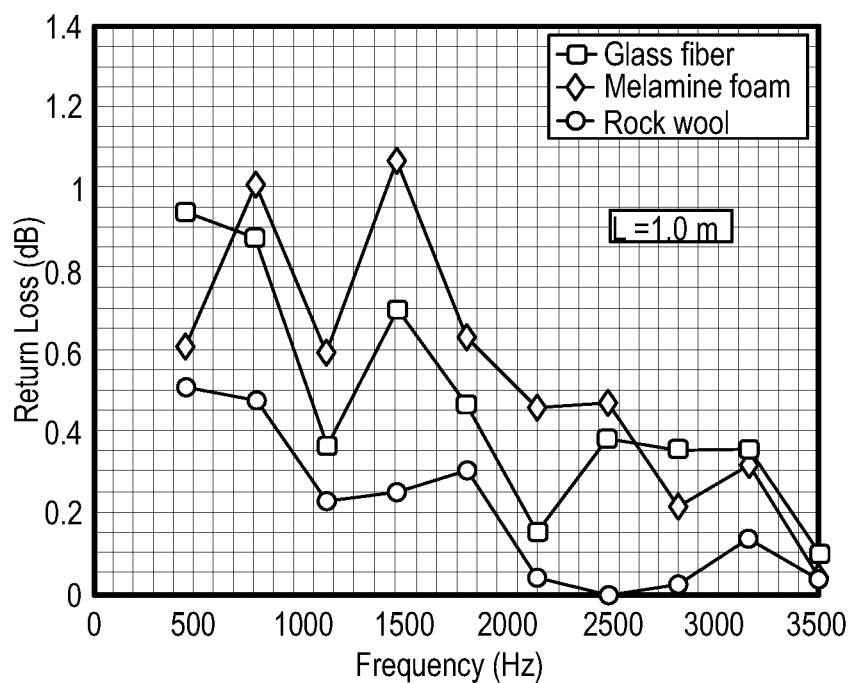
Figure 4C:
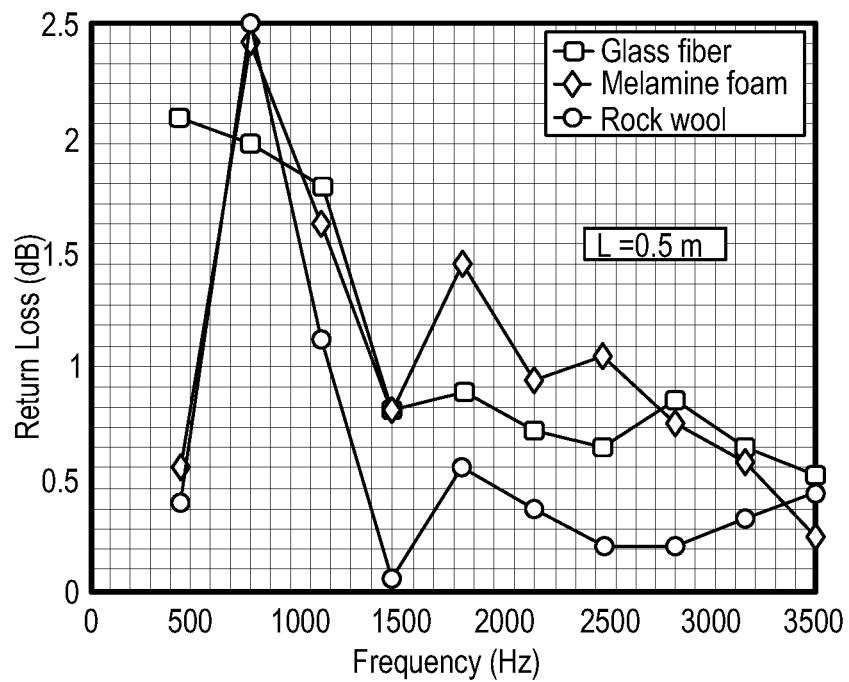
Figure 4D:
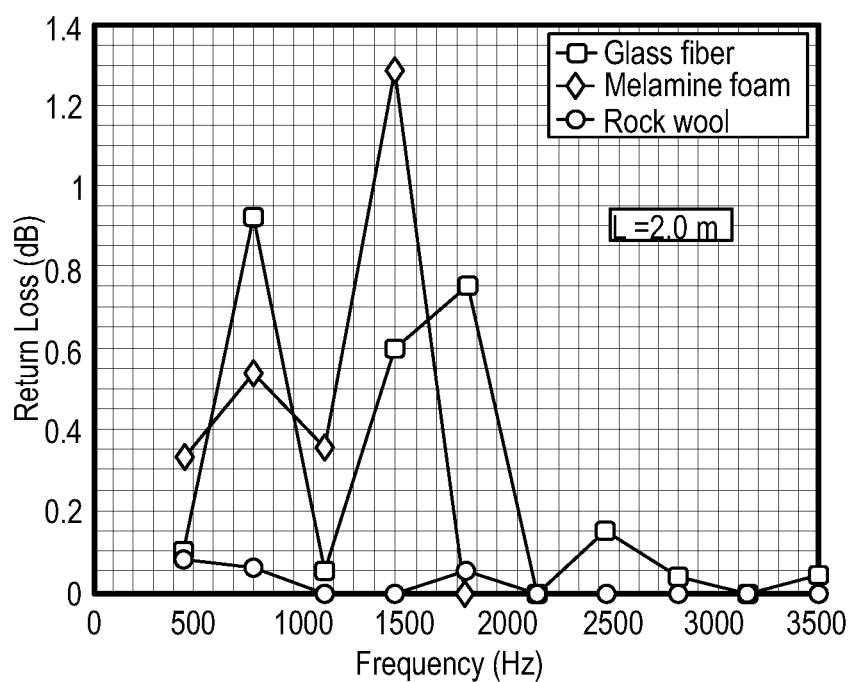
Figure 5A:
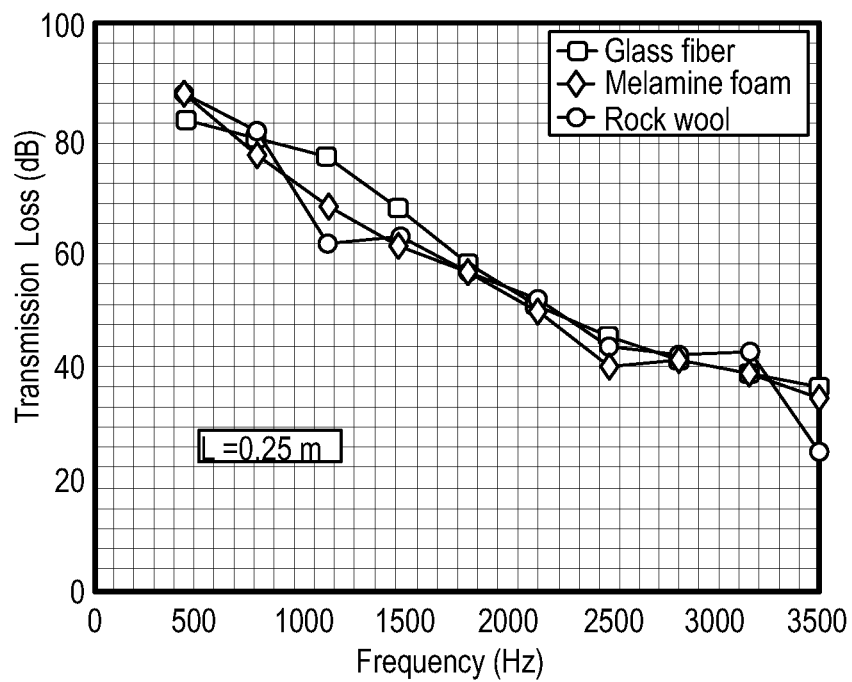
FIGS. 5A-5D are graphical representations of the analyzed transmission loss for selected porous materials using various channel lengths.
Figure 5B:
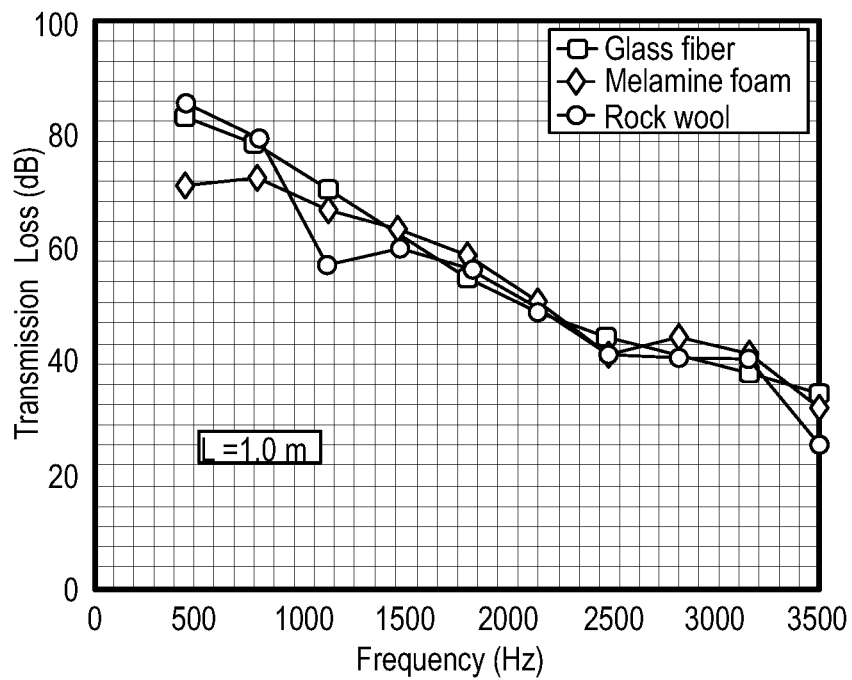
Figure 5C:
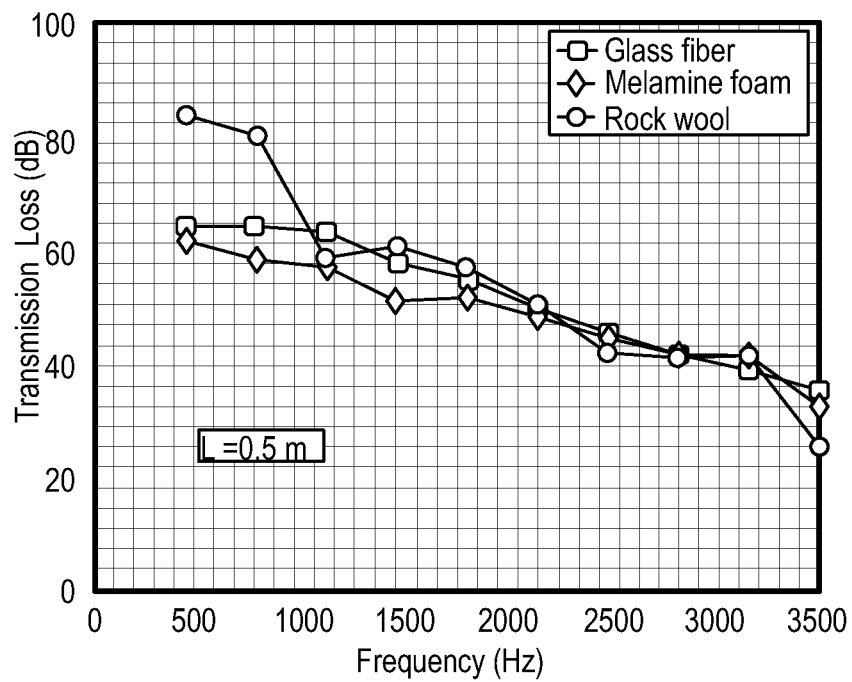
Figure 5D:
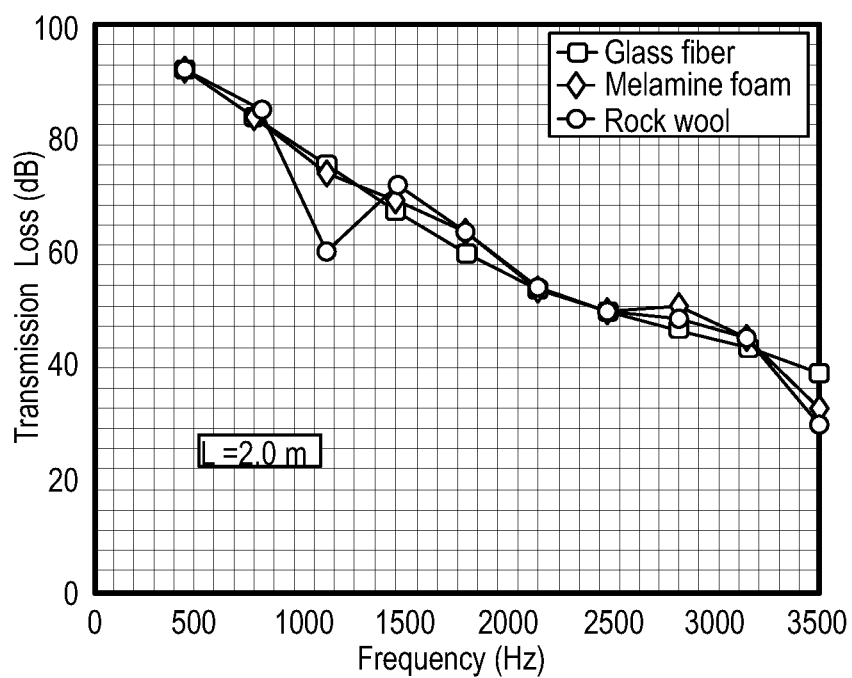
Figure 6A:
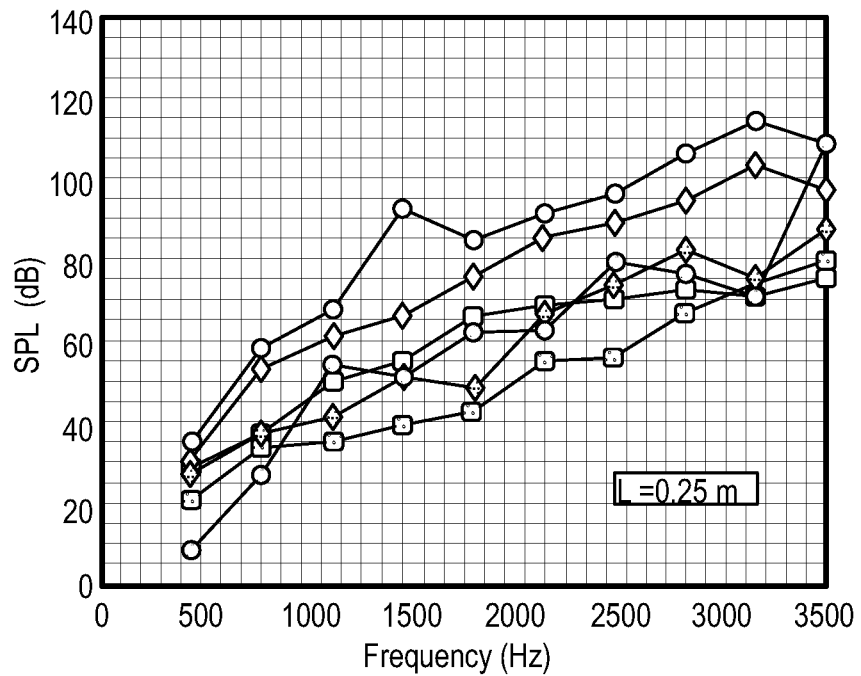
FIGS. 6A-6B are graphical representations of the analyzed sound pressure levels for selected porous materials using various channel lengths.
Figure 6A:
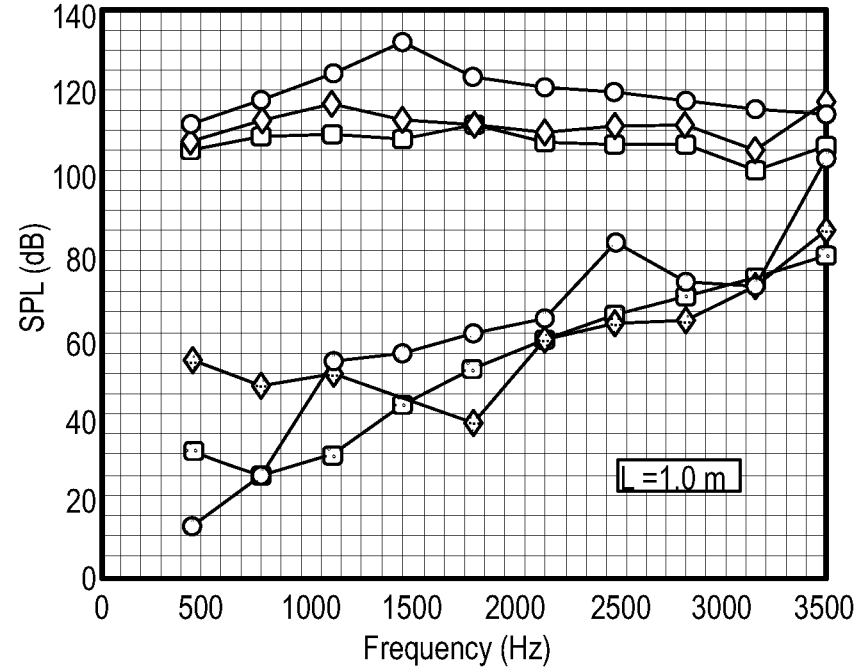
Figure 6B:
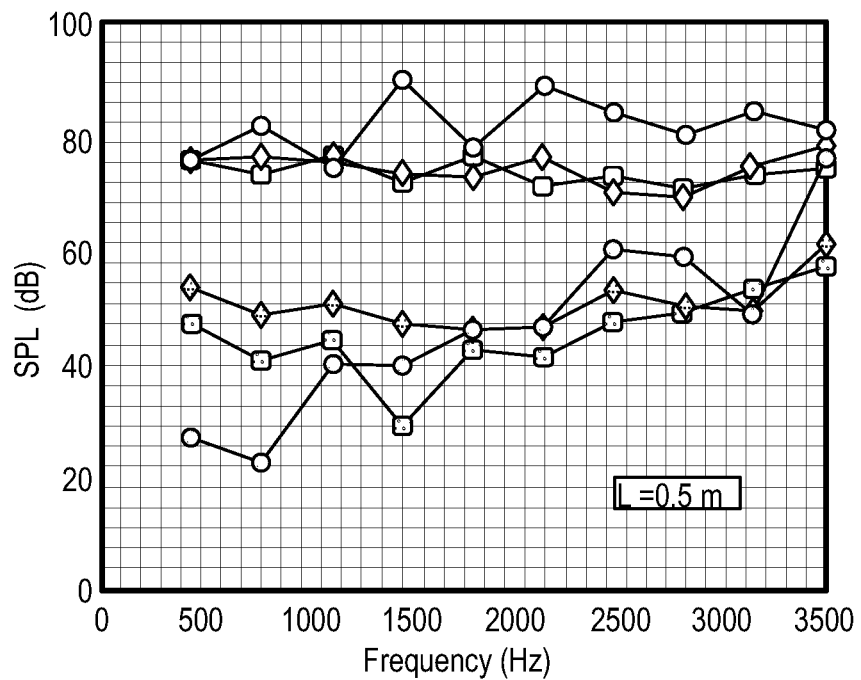
Figure 6B:
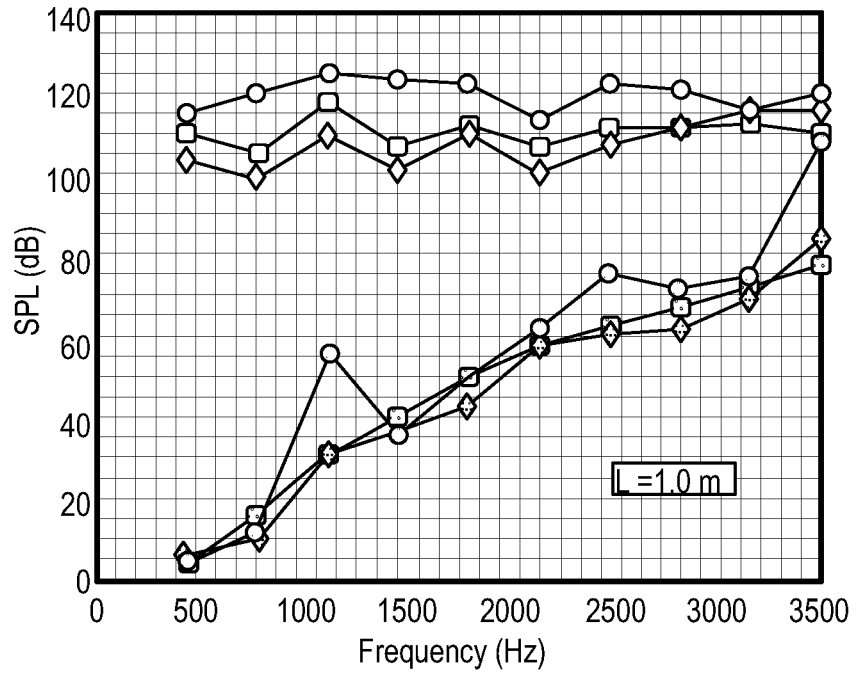

The downwash area is chosen for the acoustic analysis for its obviousness of being the noisiest zone over the landing-pad. In accordance with the present invention, the acoustic domain is segregated into three sub-domains comprising—downwash area, perforated channel (intrinsic part in the porous zone 101), and vent 103, as illustrated in FIG. 3. The Bell Nexus 4EX UAV propeller is modelled as a monopole acoustic source of 2.5 m diameter to simplify the analyses. The analysis is conducted over the frequency range of 100-3500 Hz, which is of interest in case of large UAVs. The mesh element size of 0.014 m is uniformly maintained in the mesh to satisfy the constraint of max element size ≤λ min/6 (0.0163 m), for the acoustic analysis. For acoustic modelling it is recommended to have at least 6 quadratic elements per wavelength. Therefore, maximum element size is ensured to be less than equal to ⅙ of the sound (minimum) wavelength, in the considered test range.

In an embodiment of the present invention, five characteristic parameters of the JCA poro-acoustic model includes fluid resistivity, porosity, tortuosity, viscous characteristic length, and thermal characteristic length. Accordingly, three commercial acoustic insulation/absorbent porous materials (glass fiber, melamine foam, and rock wool) are carefully selected for considerable variations in the abovementioned properties. Further, the influence of porous layer thickness is also parametrically studied by extending the inherent perforated channel lengths from 0.25-2.0 m. The corresponding meshes comprise of approximately 3-9 million elements, respectively.

TABLE 2

Properties of the investigated porous materials

| Property | Glass fiber | Melamine foam | Rockwool |
|---|---|---|---|
| Density (kg/m$^3$) | 1.2 | 8.8 | 150 |
| Fluid resistivity (Ns/m$^4$) | 10000 | 10900 | 27289 |
| Porosity | 0.98 | 0.99 | 0.93 |
| Tortuosity | 1.1 | 1.02 | 1.06 |
| Viscous characteristic length (μm) | 100 | 100 | 31 |
| Thermal characteristic length (μm) | 150 | 130 | 57 |

Return loss is the ratio of reflected acoustic power to the incident power, as defined as:

RL(dB)=10 log$_{10}$*Preflected/Pincident

The return loss ratio physically indicates the magnitude of absorbance by a surface (medium). In accordance with the present invention, return loss is desirable to ensure greater attenuation of the ambient noise. The return loss is analyzed for the selected porous materials using various channel lengths, as presented in FIGS. 4A-4D. Except for the 0.25 m channel, return loss diminishes with the increment in sound frequency, as higher frequency acoustic waves tend to bounce back more from the porous media surface. Globally, the extension of perforated channel deteriorates the acoustic absorbance, as indicated by the diminished corresponding return losses. Overall, glass fiber and melamine foam perforated channels of 0.5-1 m demonstrate most steady surface absorbance of up to (19.5-37.9) % and (21.8-42.3) %, respectively.

Transmission loss is defined as the ratio of incident acoustic power to the transmitted power, as defined as:

TL(dB)=10 log$_{10}$*Pincident/Ptransmitted

The transmission loss is indicative of reduction in the sound level of an acoustic source across a medium. The present study strives to gain transmission loss to attain maximized sound attenuation. It is analyzed across the selected porous media over different channel lengths, as presented in FIGS. 5A-5D. It is evident that the transmission loss reduces with the increment in noise frequency. Globally, extension of the perforated channel slightly augments transmission loss over acoustic range of 100-3500 Hz. The sound transmission losses achieved across channel length of 2 m by glass fiber, melamine foam, and rock wool, range between (38-92) dB, (32-91) dB, and (29-91) dB, respectively. Overall, glass fiber demonstrates the most consistent performance in noise transmission attenuation across the tested acoustic spectrum.

Noise level is quantified in terms of sound pressure level (SPL), computed as the ratio of absolute to reference sound pressure (2×10$^{-5}$ Pa for air), as:

SPL(dB)=10 log 10(Pabsolute/Preference)$^2$

In the current study, SPL level is measured at the—monopole (propeller) center, and porous media outlet (vent), along the axis of symmetry. The obtained sound dB-levels for tested porous materials subjected to various channel lengths are plotted in FIGS. 6A-6B. It is apparent that the proposed design considerably diminishes the noise levels over the entire acoustic spectrum. As expected, the noise attenuation reduces over the higher frequency band. The extension of the perforated channel noticeably augments the noise suppression phenomena. These observations are accredited to the transmission loss behavior witnessed over the tested acoustic range. The SPL suppression is exhibited by glass fiber, melamine foam, and rock wool, range between (32-105) dB, (32-97) dB, and (13-112) dB, respectively, subjected to the channel length of 2 m. Overall, glass fiber (channel length 2 m) with average 62.5 dB noise suppression, demonstrates the most consistent performance across the investigated acoustic spectrum.

Figure 7A:
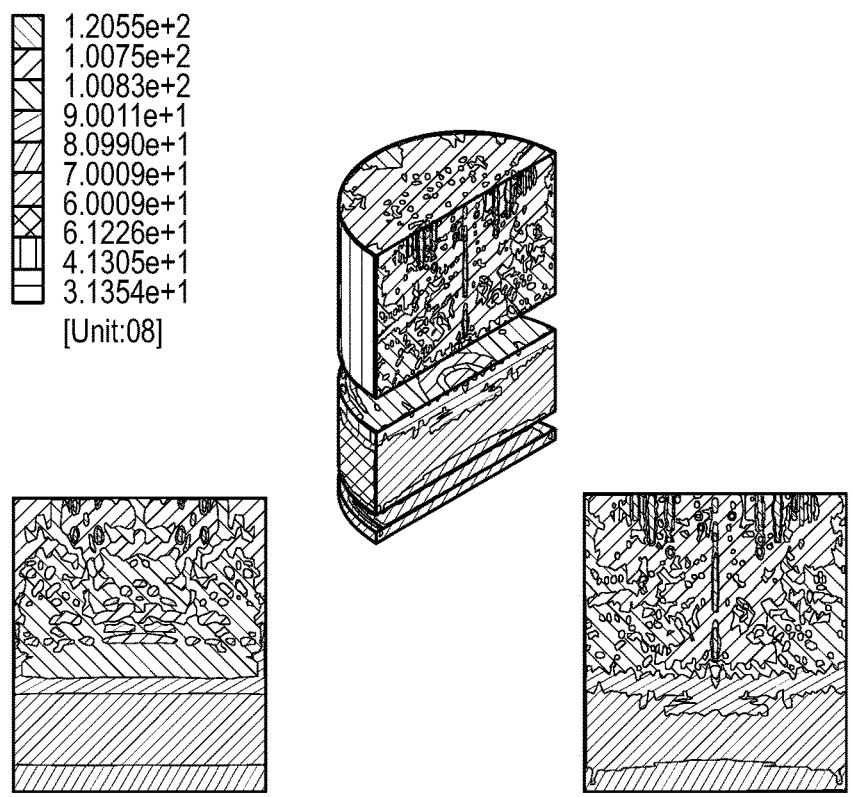
FIGS. 7A-7C depict the obtained acoustic dispersion across the selected porous media, in accordance with the present invention.
Figure 7B:
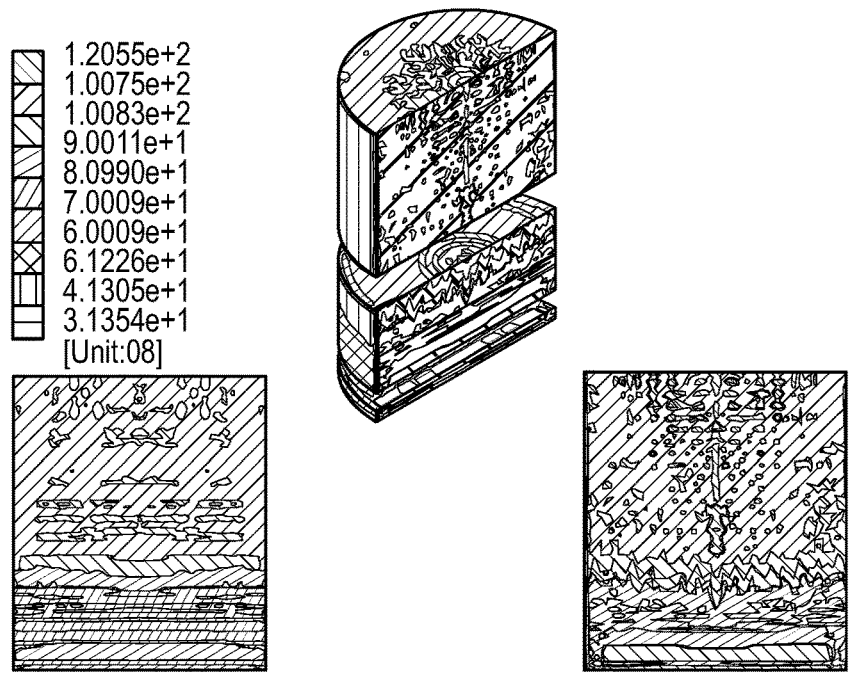
Figure 7C:
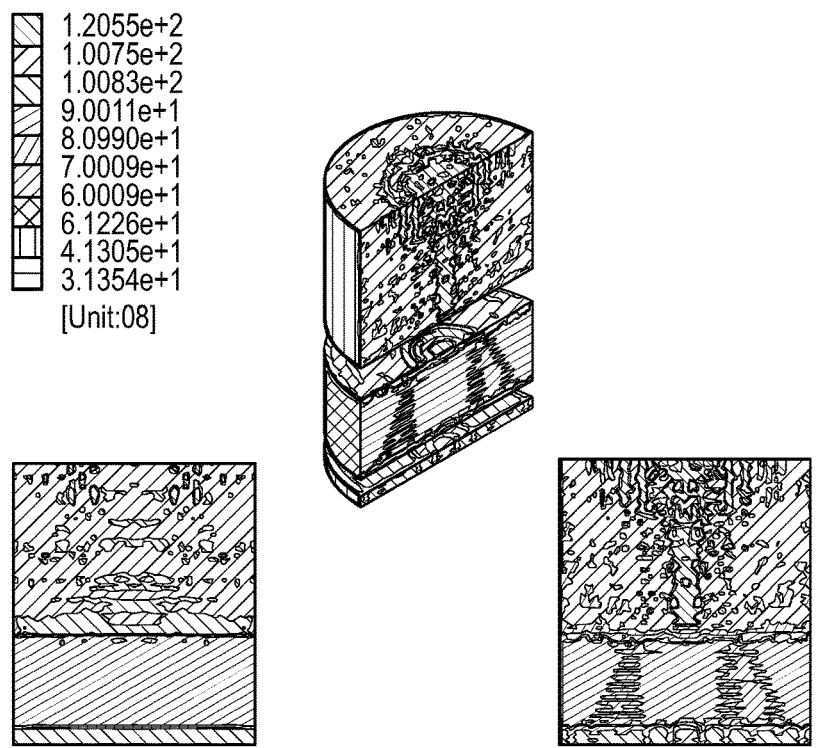

The acoustic dispersion across the selected porous media is presented in FIGS. 7A-7C. Contours corresponding only to the 1 m channel are presented to maintain brevity. The SPL contours exhibit progressive reduction in the acoustic pressure across the downwash domain, from the monopole (propeller) center to the porous media surface. The perforated channels significantly diminish the acoustic power thus producing excellent transmission losses. Eventually, downwash is vented out from the outlet domain where slight increment in acoustic pressure is evident. This phenomenon maybe be accredited to the echo of sound waves in the vent-chamber 103, which may be easily optimized by adjusting its dimensions and/or employing suitable acoustic dampeners. The noise produced by propellers generate drastic sound pressure levels in the ambience, as evident from FIGS. 7A-7C, featuring glass fiber, melamine foam, and rock wool, respectively, of channel length 1 m, exhibited (clockwise) exploded, cross-sectional, and peripheral views, respectively. The acoustic pressure radiates omnidirectionally, posing a short/long term threat to fragile equipment, structures, and humans.

Figure 8:
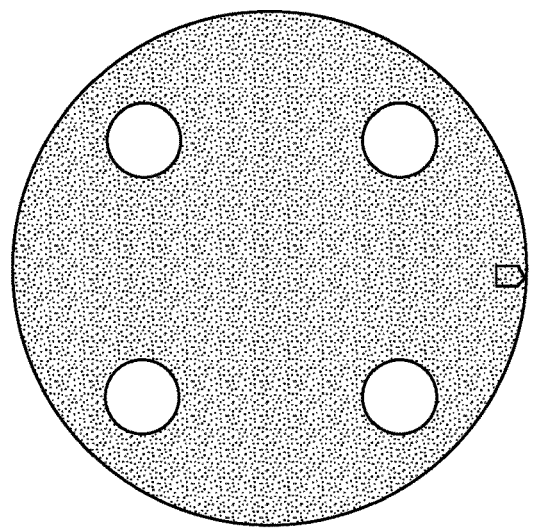
FIG. 8 shows the landing-pad simulated as a 10 mm structural steel plate, having four monopoles (propellers) symmetrically placed 1.5 m above the surface of a conventional helipad.
Figure 9:
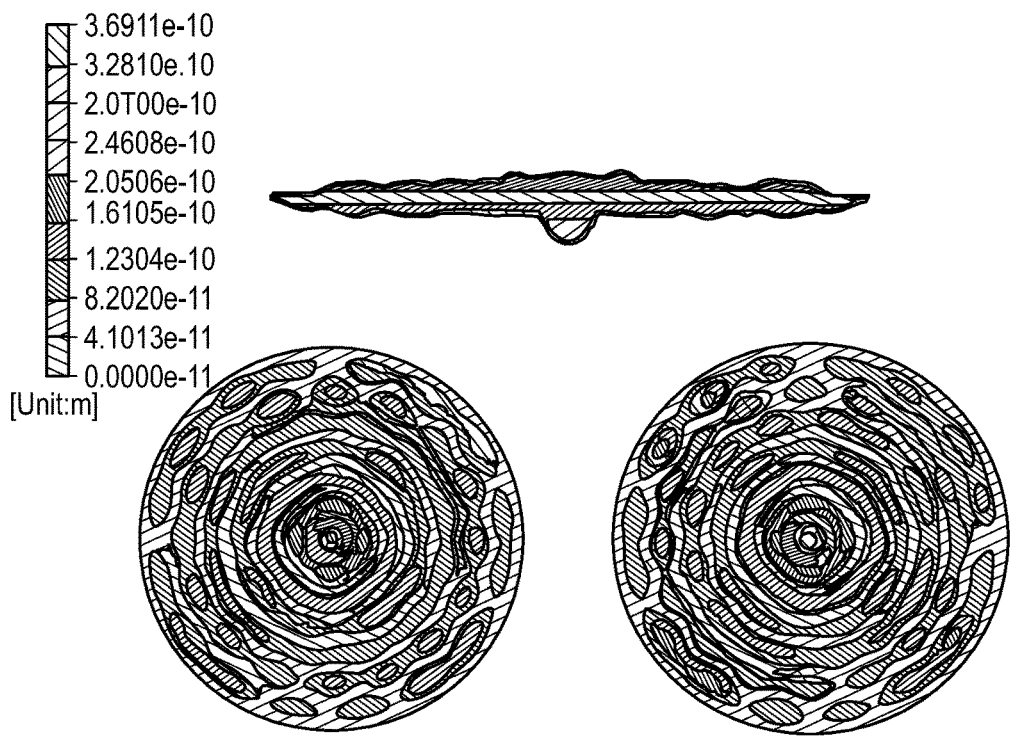
FIG. 9 presents the potential deformation of a conventional helipad (base).

In the present invention, the effect of propeller noise on the landing-pad surface is ascertained by analyzing the acoustic pressure induced deformation. The landing-pad (of a conventional helipad) is simulated as a 10 mm structural steel plate, having four monopoles (propellers) symmetrically placed 1.5 m above its surface, as shown in FIG. 8. The plate periphery is defined as 'fixed boundary', with base as 'free-surface' without underlying support, to appropriately visualize the combined deformational effects of propellers. Each monopole is considered as a 100 dB noise source in the analyses. The potential deformation of a conventional helipad (base) is presented in FIG. 9 (contours show total deformation of helipad due to acoustic pressure during take-off/landing (clockwise) planar, bottom, and top views, respectively).

Figure 10A:
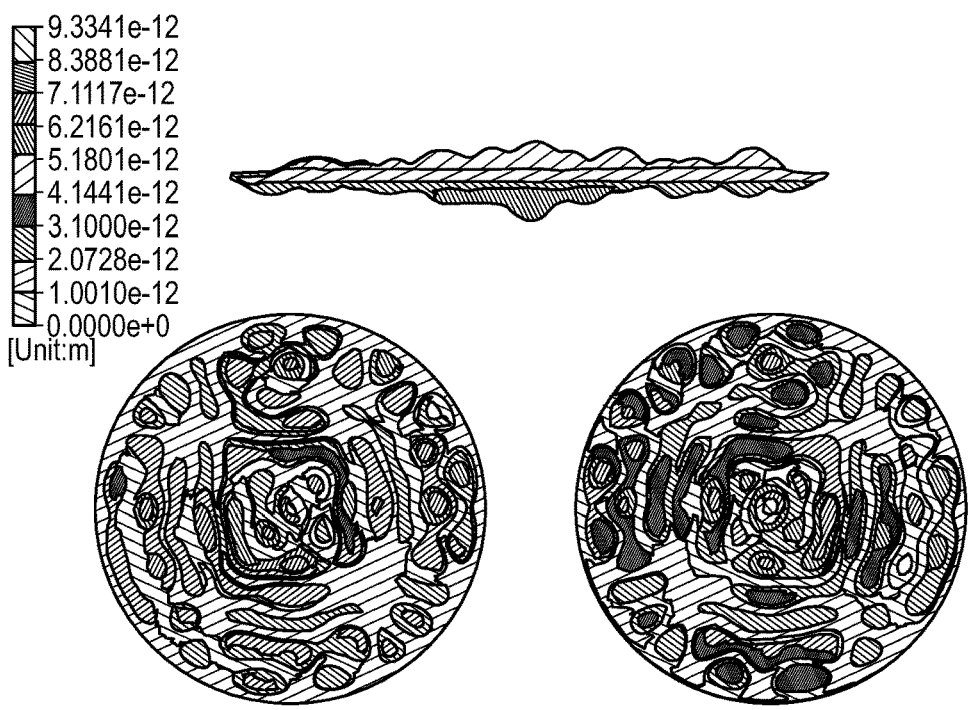
FIGS. 10A-10C present contours showing total deformation of landing-pad due to acoustic pressure subjected to glass fiber, melamine foam, and rock wool, respectively, of channel length 1 m, during take-off/landing.
Figure 10B:
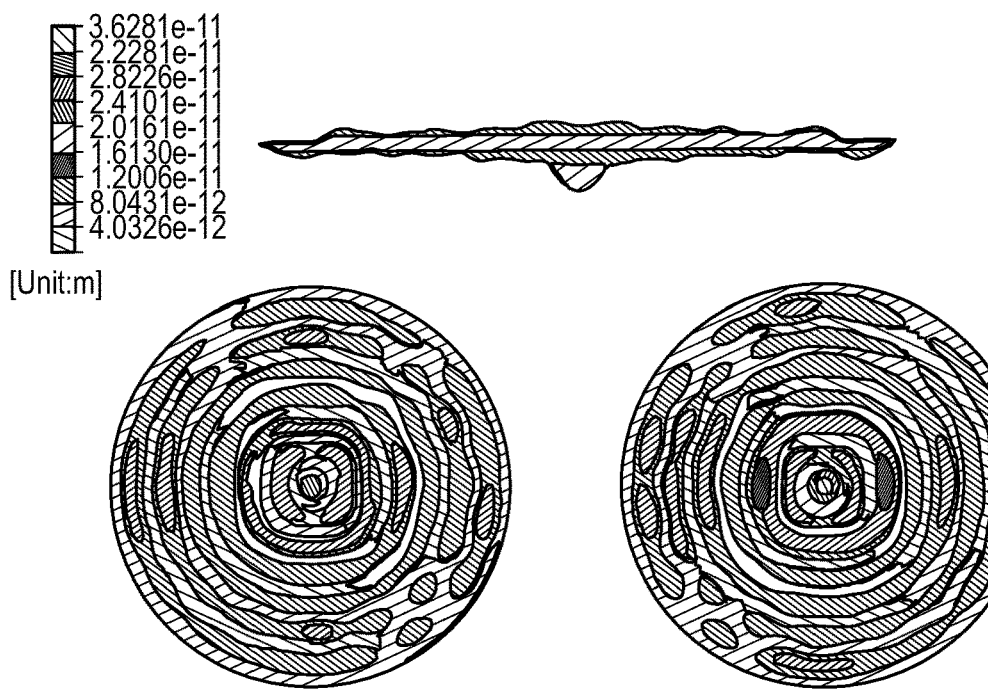
Figure 10C:
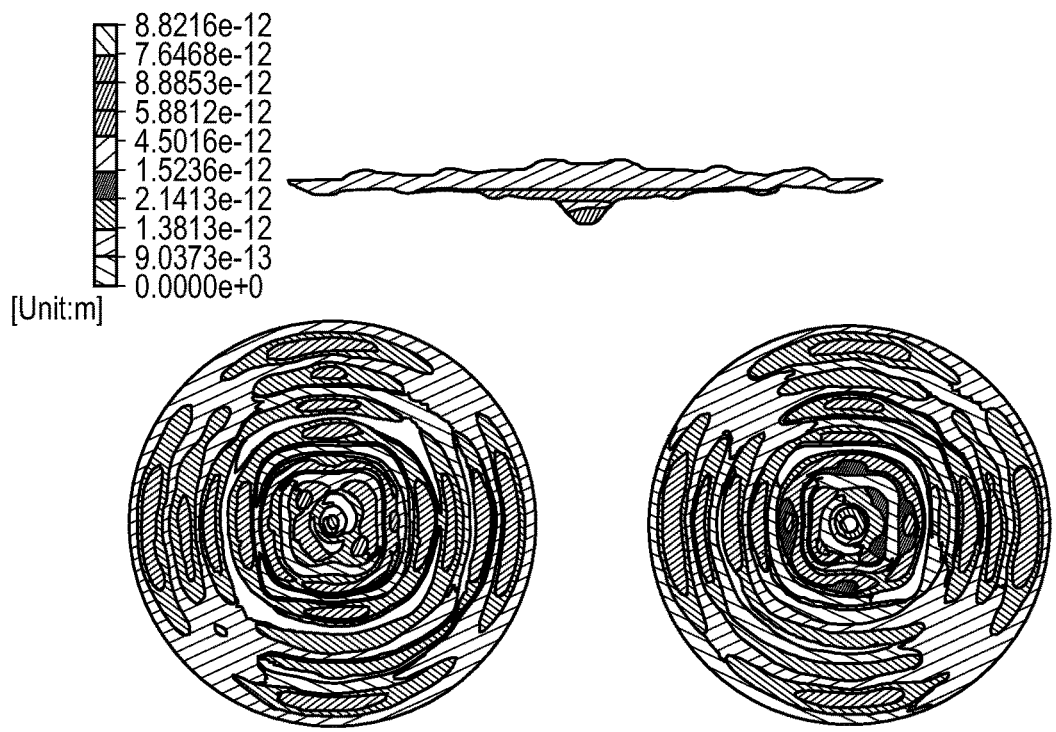

Likewise, analyses of the proposed landing-pad design featuring different porous materials with varied channel lengths is also performed. The peak deformation is obtained at the center of the landing-pad owing to the maximum overall sound pressure level (OASPL). The deformation extends radially outwards in a sinusoidal manner which is synonymous with the inherent physical nature of the sound waves. For the sake of brevity, the deformation contours corresponding to only 1 m channel length is presented herewith, as shown in FIGS. 10A-10C (contours showing total deformation of landing-pad due to acoustic pressure subjected to glass fiber, melamine foam, and rock wool, respectively, of channel length 1 m, during take-off/landing (clockwise) planar, bottom, and top views, respectively).

Figure 11:
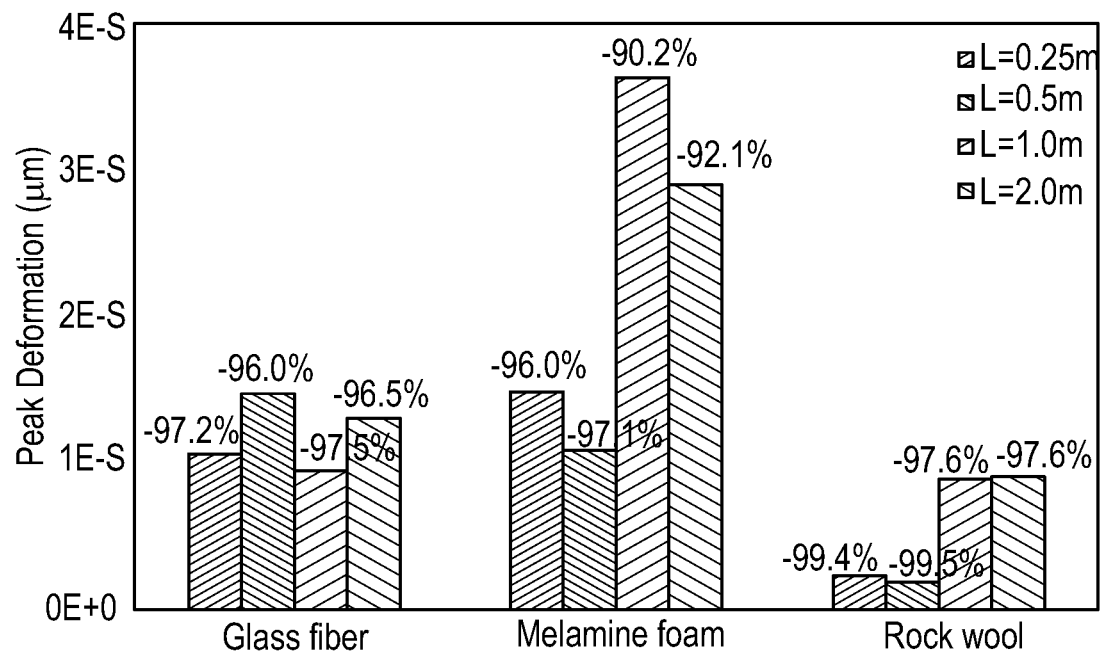
FIG. 11 depicts a comparative analysis of the peak deformation produced under the influence of selected porous media featuring various channel lengths.

Further, a comparative analysis of the peak deformation produced under the influence of selected porous media featuring various channel lengths is provided in FIG. 11 (peak-deformation of the proposed landing-pad, and relative reduction (%) with respect to a conventional helipad case). Additionally, relative reduction in the peak deformation compared to the conventional helipad design is also computed for all the test cases. It is evident that the porous media significantly diminishes the propeller noise acoustic pressure, and thereby minimizes deformation. The average peak-deformation reduction demonstrated by—glass fiber, melamine foam, and rock wool over the channel lengths of 0.25-2.0 m are—96.8%, 93.9%, and 98.5%, respectively. Overall, perforated channel length of 0.5 m exhibits the least deformational effects among the test cases.

The proposed UAV landing-pad design incorporates porous zones 101 of varied perforated channel lengths, which offers scope to effectively capture the propeller downwash thereby, subsequently suppressing ambient noise. This proves highly rewarding for landing pads located within the metropolitan area, such as on building rooftops, where propeller noise will prove to be the primary deterrent concerning commercial certification, and public comfort & community acceptance.

The proposed futuristic landing-pad design is highly effective in suppressing ambient noise. In summary, the underlying mechanism involves the following methodology—noise/acoustic absorbance at the porous surface (up to 42.3%), return loss up to 2.39 dB, a significant reduction in sound reflection to the ambience (up to 2.4 dB), propeller downwash channeling across the perforated zones, sound transmission loss across the perforated zones (up to 92 dB), overall sound pressure level being remarkably diminished (32-105 dB, average 62.5 dB) and deformation (acoustic pressure) reduction (up to 99.5%).

Figure 12A:
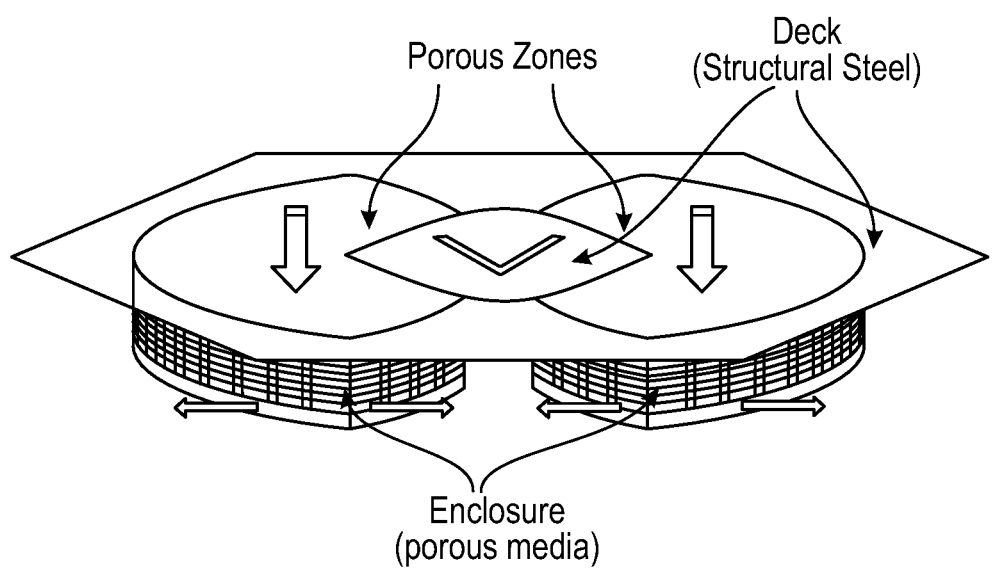
FIGS. 12A and 12B shows side and top views of the proposed landing-pad design incorporating porous zones of varied perforated channel lengths.
Figure 12B:
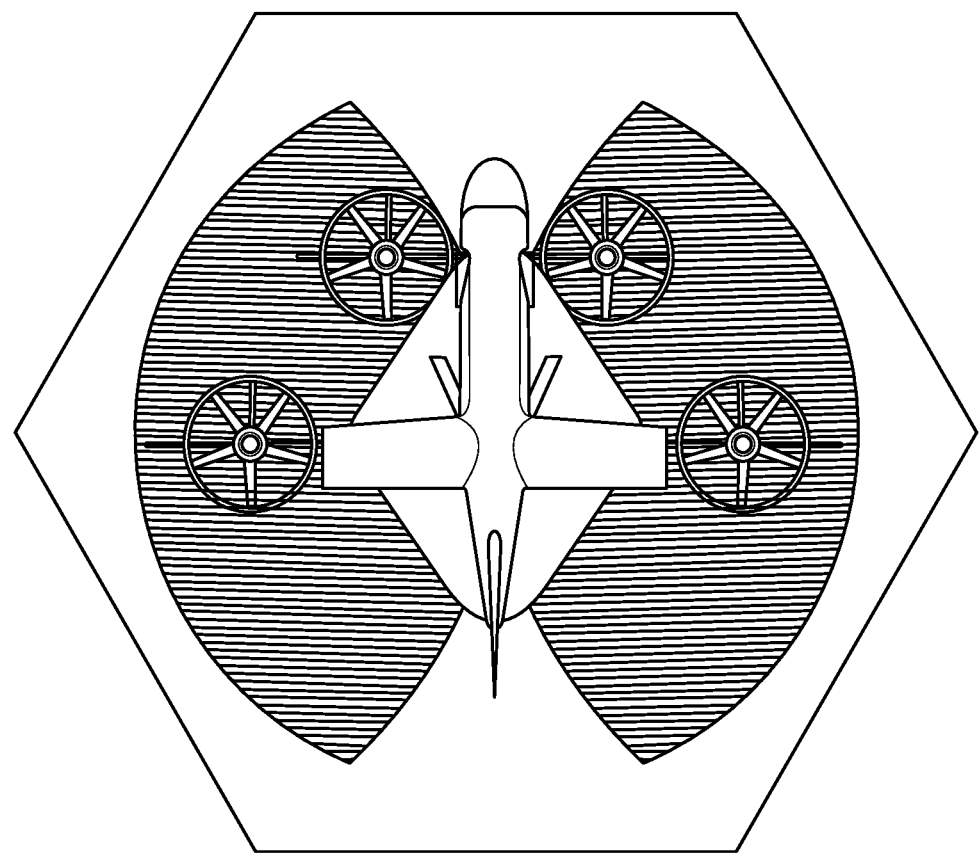

The proposed landing-pad design incorporating porous zones of varied perforated channel lengths, as illustrated in FIGS. 12A-12B. FIGS. 12A and 12B shows side and top views of the proposed landing-pad design incorporating porous zones of varied perforated channel lengths. A 3D SolidWorks model of the proposed UAV landing-pad is shown, wherein inlet (green arrows) and vent (orange arrows) indicate downwash channeling through the porous media (grey mesh) enclosed within solid grills. It offers scope to effectively capture the propeller downwash thereby, subsequently suppressing ambient noise. The design proves to be highly rewarding for landing-pads located within the metropolitan area, such as on building rooftops, where propeller noise will prove to be the primary deterrent concerning commercial certification, public comfort & community acceptance.

In accordance with the present invention, the design process primarily needs to consider the size and placement of propellers to attain maximum ambient noise suppression. The structural analyses of the landing pad also need to be included in the design process.

The proposed landing-pad design features porous regions that effectively absorb the sound waves and reduce their intensity, thereby significantly suppressing the operational noise. The design comprises a landing-pad with zones of varied porosity over specified sections/regions, a porous region featuring an aqueous sheet/curtain 102 at the inlet and along the channels, perforated channels across the porous regions of fixed/varied length and porosity.

The aqueous sheet/curtain 102 reduces noise through damping wherein aqueous droplets act as a damping agent, reducing the amplitude of sound waves passing through them (which significantly helps to reduce the overall intensity of the sound), and also turbulence, wherein the aqueous spray/curtain/sheet 102 acts as a barrier and generates turbulence in the downwash, thereby breaking up the coherent noise generated by the propellers, resulting in a reduction in overall noise levels. The aqueous sheet/curtain 102 features an aqueous spray/curtain/sheet 102 at the porous zone inlet, and along the porous zone, a multi-port injection with variable angle adjustment to the incoming downwash, variable aqueous injection pressure and mass-flow rate based on the acoustic intensity of downwash, and multiple layers of the aqueous spray/curtain/sheet 102 to entrap the acoustic waves in the porous region for minimized reflectance. The aqueous spray/curtain/sheet 102 may be placed non-equidistant from each other, and the aqueous spray/curtain/sheet 102 may not operate at the same injection pressure or mass flow rates. The incidence angle of the jet/spray nozzles may also be adjusted independently for each aqueous curtain/sheet 102 to achieve maximum attenuation based on local airflow regime.

In accordance with the present invention, the proposed landing-pad design features porous zone(s) which are tasked with channeling the propeller downwash through perforated media. This design renders the surface 'absorbent' boundary-condition, generating noticeable acoustic return losses. Further, downwash funneling through the inherent perforated channels results in significant sound transmission loss. Collectively, this engenders significant reduction in the ambient noise. The proposed landing-pad design incorporates porous zones 101 of varied perforated channel lengths, to effectively capture the propeller downwash thereby, subsequently suppressing ambient noise. It proves highly rewarding for the landing-pads located within the metropolitan area, such as on building rooftops, where propeller noise will prove to be the primary deterrent concerning commercial certification, and public comfort & community acceptance.

Primarily, the acoustic domain is segregated into three sub-domains comprising—downwash area, perforated channel, and vent. The Bell Nexus 4EX UAV propeller is modelled as a monopole acoustic source of 2.5 m diameter to simplify the analyses. Analysis is conducted over the frequency range of 100-3500 Hz, which is of interest in case of large UAVs.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the invention, defined in scope by the following claims.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. A system for reducing ambient noise associated with urban air mobility (UAM) services, comprising:
a landing pad comprising a plurality of zones of varied porosity levels over specified sections, and a plurality of perforated channels across the plurality of zones of varied porosity levels, wherein the perforated channels feature a plurality of aqueous spray sheets being sprayed through a plurality of spray nozzles placed at an inlet of the perforated channels and along the perforated channels.

2. The system of claim 1, wherein the acoustic domain is segregated into three sub-domains comprising downwash area, perforated channel, and vent.

3. The system of claim 1, wherein the specified sections have fixed lengths and porosity levels.

4. The system of claim 1, wherein aqueous droplets present in the aqueous spray sheets act as damping agents/barriers for ambient noise, and thereby reduce overall amplitude and turbulence of passing sound waves.

5. The system of claim 1, wherein the plurality of aqueous spray sheets are non-equidistant from each other, and operate at varying injection pressure or mass flow rates.

6. The system of claim 1, wherein the system aims at reducing ambient noise produced by unmanned aerial vehicle (UAV) landing operations.

\* \* \* \* \*